Feb. 23, 1937. C. SHAW ET AL 2,072,013
DOWELING MACHINE
Filed June 18, 1935 4 Sheets-Sheet 1

Claude Shaw
Jack Best
INVENTOR

BY Victor J. Evans & Co.
ATTORNEYS

Feb. 23, 1937.  C. SHAW ET AL  2,072,013
DOWELING MACHINE
Filed June 18, 1935  4 Sheets—Sheet 2
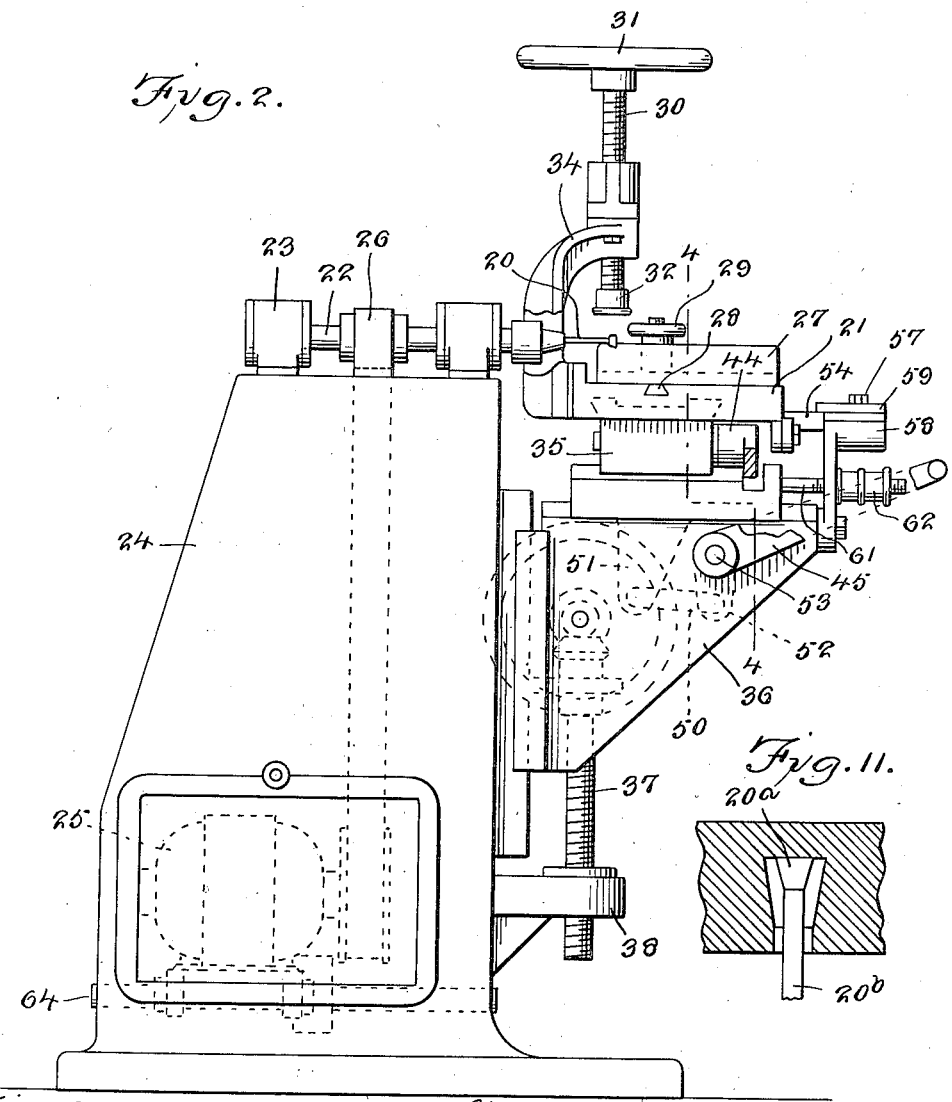
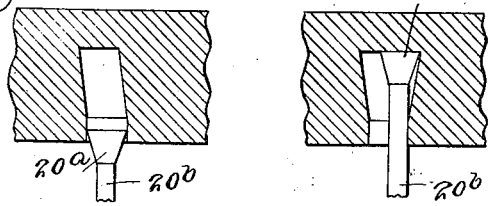

Feb. 23, 1937.  C. SHAW ET AL  2,072,013
DOWELING MACHINE
Filed June 18, 1935   4 Sheets-Sheet 3
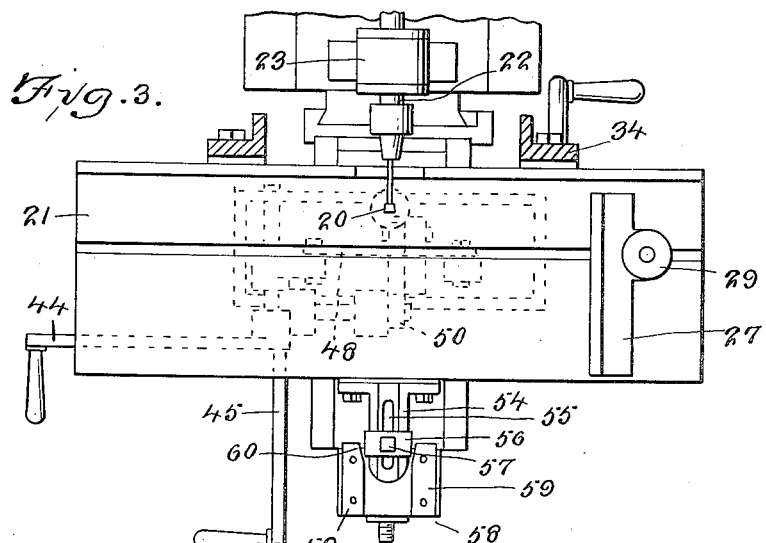
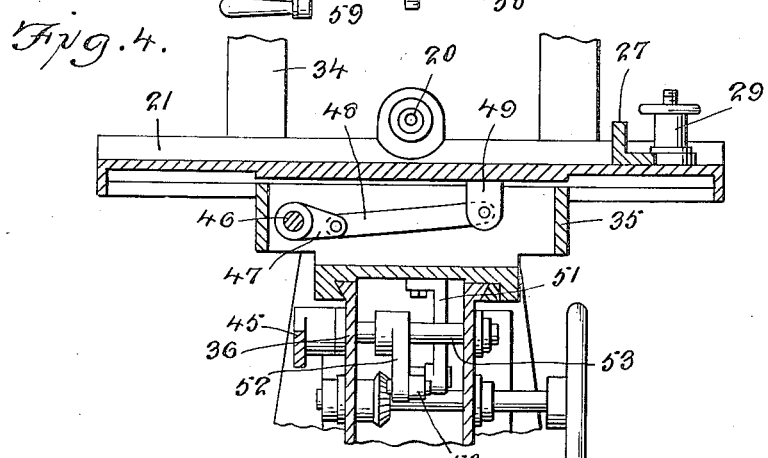
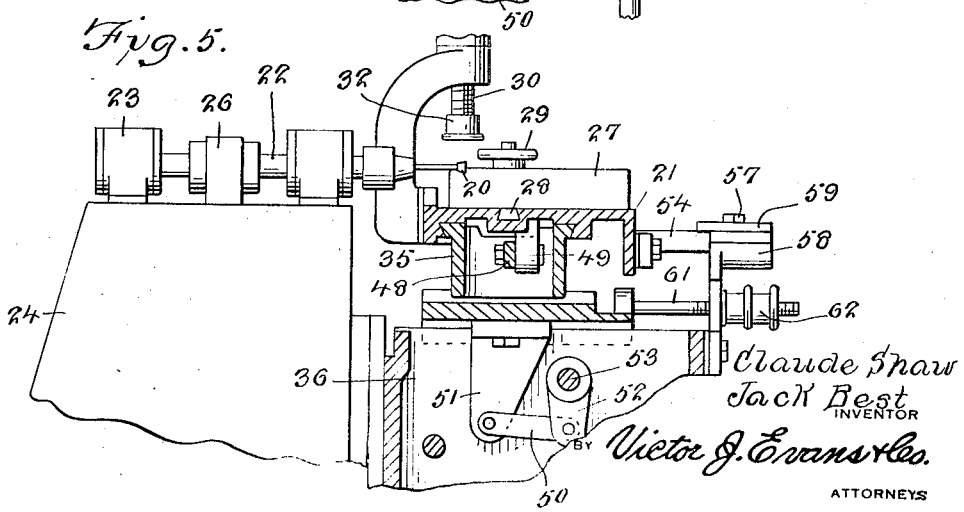

Feb. 23, 1937.  C. SHAW ET AL  2,072,013
DOWELING MACHINE
Filed June 18, 1935  4 Sheets-Sheet 4
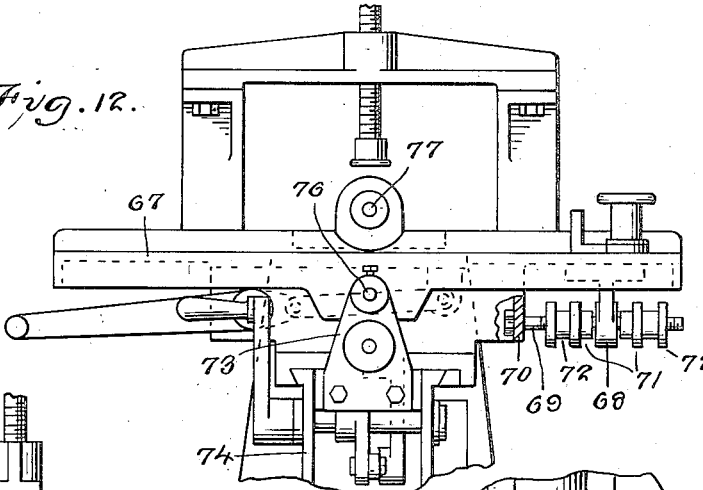
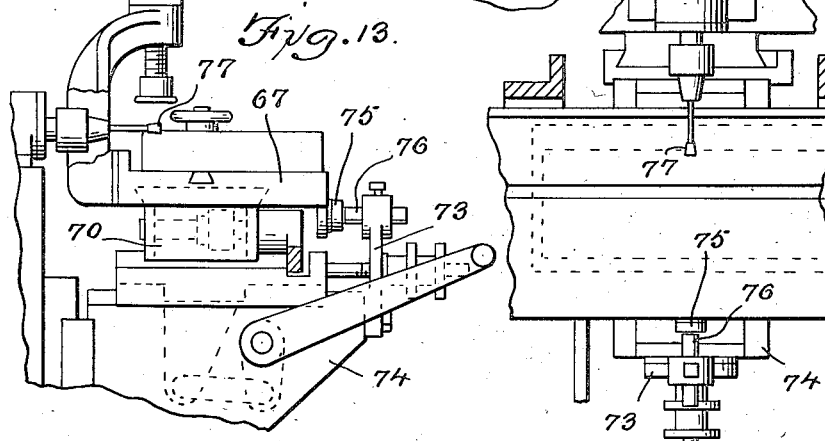
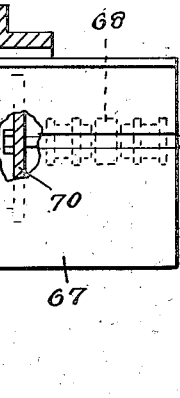
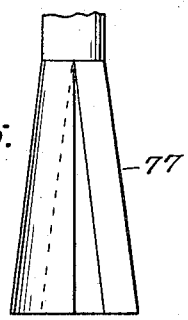
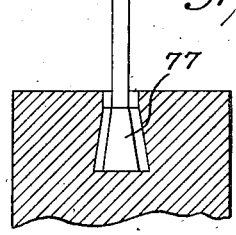
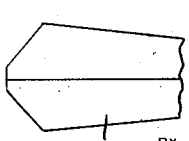
Claude Shaw
Jack Best
INVENTOR
BY Victor J. Evans & Co.
ATTORNEYS Patented Feb. 23, 1937

2,072,013

UNITED STATES PATENT OFFICE 2,072,013

DOWELING MACHINE

Claude Shaw and Jack Best, Bristol, Va.; said Best assignor to said Shaw

Application June 18, 1935, Serial No. 27,262

4 Claims. (Cl. 144—87)

The object of the invention is to provide a dowel machine adapted for forming the sockets for dowels in which the extremities of the dowels are spread in the bottoms of the sockets so that the dowels will be positively precluded from being withdrawn when attached; to provide a dowel socket forming machine in which the lateral enlargement of the socket may be effectively accomplished along one diameter only, thus providing against angular or turning movement of the dowel when seated therein; to provide a dowel forming machine in which the work is fed to the tool and positively guided in such operation so that the uniformity of the socket is insured; to provide a machine of the kind indicated in which a belt driven tool is insured effective driving by reason of a constant belt tension being maintained; and to provide a doweling machine which is of comparatively simple form and therefore susceptible of cheap manufacture.

With this object in view, the invention consists in a construction and combination of parts, of which a preferred embodiment is illustrated in the accompanying drawings, wherein:

Figure 2 is a side elevational view.

Figure 3 is a sectional view on the plane indicated by the line 3—3 of Figure 1.

Figure 4 is a sectional view on the plane indicated by the line 4—4 of Figure 2.

Figure 5 is a sectional view on the plane indicated by the line 5—5 of Figure 1.

Figure 7 is an end view of the bit shown in Figure 6.

Figure 8 is a side view of the bit shown in Figure 6 but looking from a position at right angles to that in which Figure 6 is viewed.

Figure 9 is a diagrammatic view showing the first step in the forming of the dowel socket.

Figure 10 is a similar view of the second step.

Figure 11 is a similar view of the third step.

Figure 12 is a front elevational view of a modified form, the bit and its associated parts only being shown in this view.

Figure 13 is a side elevational view of the structure of Figure 12.

Figure 14 is a top plan view of the structure of Figure 12.

Figure 15 is a side elevational view of the form of bit employed in that form of construction shown in Figure 12.

Figure 16 is an end elevational view of the bit shown in Figure 15.

Figure 17 is a side elevational view of the bit shown in Figure 15 but looking in a direction at right angles from that in which Figure 15 is viewed.

Figure 18 is a diagrammatic view to illustrate the socket forming operation when employing the structure of Figure 12.

Figure 1:
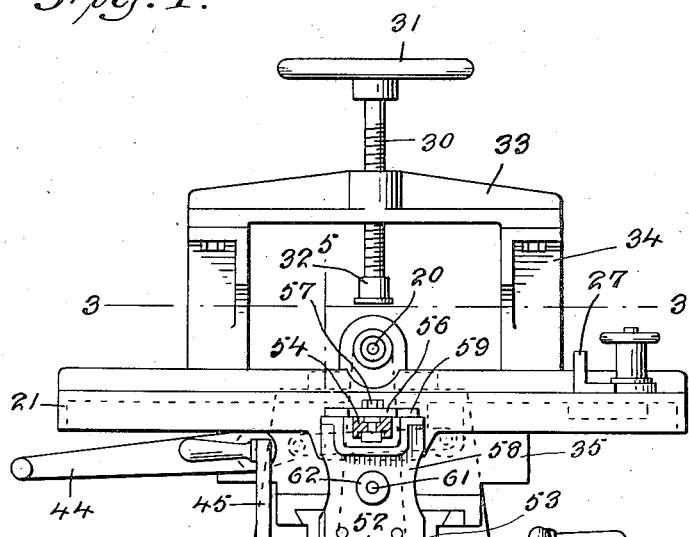
Figure 1 is a front elevational view of a machine constructed in accordance with the invention.

The invention functions to feed the work to the bit or tool 20, the work being carried on a table 21 and the bit in a spindle 22, which is journaled in bearings 23 on top of the column 24. The column is preferably hollow, so that it may house the driving motor 25 which is operatively connected with the spindle through the instrumentality of a belt 26.

The work table 21 is provided with an adjustable stop or abutment plate 27, this plate being held in rightangular position with reference to the length of the table by means of a rib 28 traversing a dovetail slot in the upper face of the table 21, a clamp nut 29 being provided to maintain the selected adjustment.

After placement on the table against the stop plate, the work is clamped in position by means of a clamp screw 30 having a hand wheel 31 and a swivel bearing foot 32. The clamp screw is threadingly mounted in the cross bar 33 of a yoke, the legs 34 of which are connected with the work table, being preferably upstanding integral projections of the work table disposed at the rear edge of the latter and on opposite sides of the spindle.

The work table 21 is mounted for sliding movement on a saddle 35, so that the work table moves transversely of the column, while the saddle is mounted for movement toward and away from the column but being carried on a knee 36.

The conventional slide bearings are provided between the saddle and the knee and likewise between the knee and the column, the knee being vertically adjustable on the column by reason of an elevating screw 37, the lower end of which is threadingly engaged with a bushing carried by a bracket 38 projecting from the column. The upper end of the screw is journaled in a web 39 in the knee, and collars are disposed above and below the web, the upper collar being the hub of a bevel gear 40 meshing with a bevel gear 41 carried by the shaft 42, which is journaled in the knee and projects laterally from the latter to receive the hand wheel 43. Obviously, rotation of the hand wheel will, through the bevel gear connection, impart rotary or turning movement to the screw and thereby raise or lower the knee because of the screw connection with the bracket 38.

Movement of the table on the saddle and of the saddle on the knee is accomplished by means of cranks 44 and 45, the former crank being carried at the extremity of a shaft 46 journaled in the saddle and provided, beneath the table, with an arm 47 with which a link 48 is connected, the remote end of the link being pivotally connected with a pendent leg 49 on the under face of the table. Obviously, angular movement imparted to the crank 44 will effect table movement on the saddle by reason of the arm and link connection 47—48.

The crank 44 swings in a plane parallel to the plane of the front face of the column 24, while the crank 45 swings in a plane at right angles to the plane of the crank 44 and is operatively connected to the saddle by means of a link 50, the link having terminal pivotal connections with a pendent arm 51 on the under face of the saddle and with a swinging arm 52 carried on a shaft 53 on which the crank 45 is mounted, the shaft being journaled in opposite walls of the knee. Obviously, rocking movement imparted to the shaft 53 through the instrumentality of the crank 45 will effect the movement of the saddle towards and away from the column.

While the two cranks 44 and 45 provide for movement of the table laterally of the column as well as towards and away from it, the extent of such movement must be controlled if the intended dowel socket is to be perfectly formed. To this end, there is provided a table guide, consisting of table-carried and knee-carried elements and an adjustable stop to limit inward movement of the saddle and therefore the movement of the table towards the column or tool.

The table-carried element consists of a bracket 54, slotted as indicated at 55, and carrying a rectangular block 56 adjustably secured to it by means of a bolt 57 which passes through the slot 55. Thus the block may be adjusted along the bracket toward and away from the table, and it is retained in position with its longer dimension transverse of the bracket. The fixed member consists of a bracket 58 which is bolted to the front face of the knee and on the upper edge is depressed to form a clearance space for the bracket 54, the side edges of the bracket above the depressed portion receiving guide bars 59, the inner edges of which are beveled at the inner ends as indicated at 60. The guide bars are spaced just the distance of the length of the block 56, so that when the block is between them, movement of the table on the saddle is precluded, such movement being only possible when the block is in the zone of the beveled edges 60.

Movement of the saddle towards the column, and therefore movement of the table towards the tool, is controlled by an adjustable abutment consisting of a stem 61 on the table which extends through the bracket 58 and receives on its outer threaded end the nuts 62, of which the inner nut acts as the stop and the outer nut as the lock nut. The amount of inward movement of the table having previously been determined, the nuts 62 are set and thereafter serve to arrest inward movement of the table beyond a certain point.

The tool 20 is formed with a boring head 20a of materially greater diameter than the shank 20b, so that the shank will not contact with the walls of the hole when drilling inwardly at an angle as the machine is designed to do.

The socket to be formed is of uniform size on one dimension and of progressively increasing size on a right-angularly related dimension, but is formed with a rotary tool so that from the open end to the bottom it increases from circular form to substantially oval form, in which the sides of the oval or the major axis are parallel.

The depth to which the socket is to be formed is determined by the setting of the stop nut 62. The guide plates 59, at the beveled edges 60, determine the enlargement of the socket at the bottom and the angle at which the enlargement takes place. The stop plate 27 having been set to the proper position, the work is placed on the table in edge contact with the stop plate 27, after which the clamp screw is brought down to retain it in place. The motor having been started, the work is fed to the bit or tool 20 by imparting movement to both the table and the saddle, through the cranks 44 and 45. As long as the block 56 is between the straight edges of the guide bars 59, no movement of the table transversely of the column is possible, but after the saddle has moved in a sufficient distance to dispose the block in the zone of the beveled edges 60, the table may be moved the extent necessary to keep the corner of the block in contact with a beveled edge. This results in the forming of a hole such as that indicated in Figure 9, the inward movement of the table being accompanied with longitudinal movement thereof, so that the axis of the hole is constantly deflected. The second step consists in boring inward with the block 56 in contact with the opposite beveled edge 60, so that the hole then assumes the shape shown in Figure 10. This operation is followed by movement of the table to center the bit, which results in taking out any rises that the bottom of the socket thus forms. As long as the block 56 is between the straight edges of the guide bars, the hole formed will be cylindrical. The motor 25 is carried on a base 63 within the column, this base being swingingly mounted on a rock shaft 64 secured to the column. The base is wholly on one side of the rock shaft, but is provided with an arm 65 on the opposite side, on which is carried an adjustable counter-weight 66. The degree to which the counter-weight balances the motor can be varied, and thus a predetermined excess weight of motor may be utilized for belt tension. In other words, the swinging mounting of the motor provides for its maintaining a constant belt tension, the degree of which is regulated by the adjustment of the counter-weight.

In the modified form of the invention illustrated in Figures 12 to 14, inclusive, table movement, saddle movement and knee adjustment are accomplished as in the preferred form, but the modification consists in first drilling into the work and thereafter enlarging the hole or socket. To this end, the table 67 is provided with a pendent bracket 68 formed with an eye or opening through which a screw 69 carried by the saddle 70 projects, stop and lock nuts 71 and 72 being mounted on the screw on opposite sides of the bracket. The adjustment of the stop nuts 71 thus limits movement of the table on the saddle.

Figure 6:
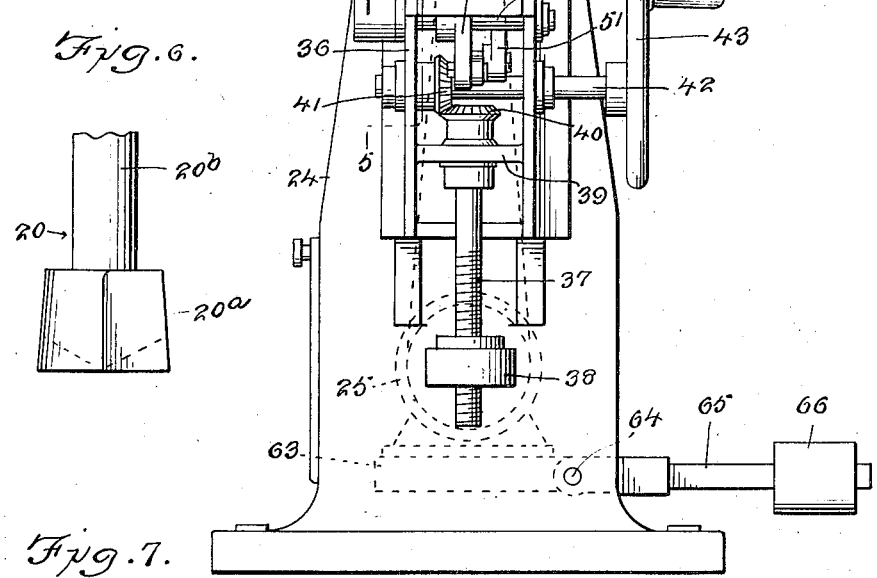
Figure 6 is an elevational view of one form of bit.
Figures 7, 8:
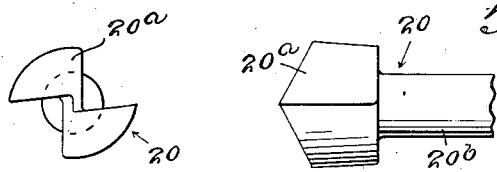

A bracket 73 secured to the knee 74 replaces the bracket 58 as formed at its upper end with a guide eye 75, through which a stem 76 carried by the table projects. Inward movement of the saddle is limited in the same way as in that form of the invention illustrated in Figures 1 to 11, inclusive.

The bit or tool 77 which is employed is of the general shape of the socket to be formed, but its largest diameter at the cutting end is the same as the smallest diameter of the socket. The work having been set on the table is fed toward the tool and the latter bores a cylindrical hole, as long as the pilot 76 is within the eye 75. After the full depth of the hole has been secured, the pilot 76 is clear of the eye 75, after which movement of the table on the saddle may be effected, first, until one of the stop nuts 71 abuts the bracket 68, and then in the opposite direction until the other of the stop nuts 71 abuts the bracket. Thus a socket of the shape shown in Figure 18 will be formed. In this form of the invention, while the desired shape of the socket is maintained, its depth is limited to the size of the particular tool employed, and the socket does not have the true oval conformation desired throughout the enlarged portions but only at the bottom. In the preferred form, the socket at the entrance is of circular form and thereafter progressively is enlarged across one diameter.

The dowel socket formed by the machine is designed for the use of circular dowels, of which the ends are split for the reception of wedges, so that when the dowels are seated in sockets, they are spread into the enlarged portions, thereby effectively locking the dowel to the piece, so that it is not only precluded from being withdrawn, but also precluded from any turning or angular movement in the socket.

The invention having been described, what is claimed as new and useful is:

1. A machine for forming dowel sockets progressively enlarged towards their bottoms from a circular to an oval shape comprising a rotary bit having terminal cutting teeth and a shank from which the teeth extend radially, a spindle in which the bit is carried, a column on which the spindle is journaled, a knee supported on the column below the bit, a saddle mounted on the knee and movable toward and away from the column in the direction of the axis of the spindle, a work holding table supported on the saddle and movable laterally of the column below the bit, and cooperating guide members carried by the table and knee respectively to preclude movement of the table laterally of the column in one position of the saddle but to permit such movement of the table, in another position of the saddle, a distance equal twice the radial extent of the bit teeth over the shank thereof.

2. A machine for forming dowel sockets progressively enlarged towards their bottoms from a circular to an oval shape comprising a rotary bit having terminal cutting teeth and a shank from which the teeth extend radially, a spindle in which the bit is carried, a column on which the spindle is journaled, a knee supported on the column below the bit, a saddle mounted on the knee and movable toward and away from the column in the direction of the axis of the spindle, a work holding table supported on the saddle and movable laterally of the column below the bit, a bracket mounted on the knee, a bracket mounted on the table, a block carried on the last said bracket, and spaced guide bars carried by the first said bracket and between which the block travels in movement of the saddle toward and away from the column, said guide bars being spaced according to the dimension of the block longitudinally of the table but beveled at their inner ends at an angle in accordance with the angle at which the dowel socket is enlarged.

3. A machine for forming dowel sockets progressively enlarged towards their bottoms from a circular to an oval shape comprising a rotary bit having terminal cutting teeth and a shank from which the teeth extend radially, a spindle in which the bit is carried, a column on which the spindle is journaled, a knee supported on the column below the bit, a saddle mounted on the knee and movable toward and away from the column in the direction of the axis of the spindle, a work holding table supported on the saddle and movable laterally of the column below the bit, a bracket mounted on the knee, a bracket mounted on the table, a block carried on the last said bracket and spaced guide bars carried by the first said bracket and between which the block travels in movement of the saddle toward and away from the column, said guide bars being spaced according to the dimension of the block longitudinally of the table but beveled at their inner ends at an angle in accordance with the angle at which the dowel socket is enlarged, the saddle having a stem passing slidably through a guide opening in the knee carried bracket and an adjustable stop mounted on the stem to abut such bracket and limit the movement of the saddle toward the column.

4. A machine for forming dowel sockets progressively enlarged towards their bottoms from a circular to an oval shape comprising a rotary bit having terminal cutting teeth and a shank from which the teeth extend radially, a spindle carrying and rotating the bit, a work holding table, a support for the work holding table on which the latter is mounted for movement toward and from the bit axially of the same and also laterally of the bit, and cooperating guide members carried by the table and support respectively to preclude movement of the table laterally of the bit in one position on the support but to permit such movement of the table, in another position on the support, a distance equal twice the radial extent of the bit teeth over the shank thereof.

CLAUDE SHAW.
JACK BEST.